Feb. 24, 1931.  L. E. HINTON  1,793,802

DRAFT NORMALIZER

Filed March 26, 1928     2 Sheets-Sheet 1

Inventor:
Leroy E. Hinton
By Cheever & Cox
Attys.

Feb. 24, 1931.  L. E. HINTON  1,793,802
DRAFT NORMALIZER
Filed March 26, 1928   2 Sheets-Sheet 2
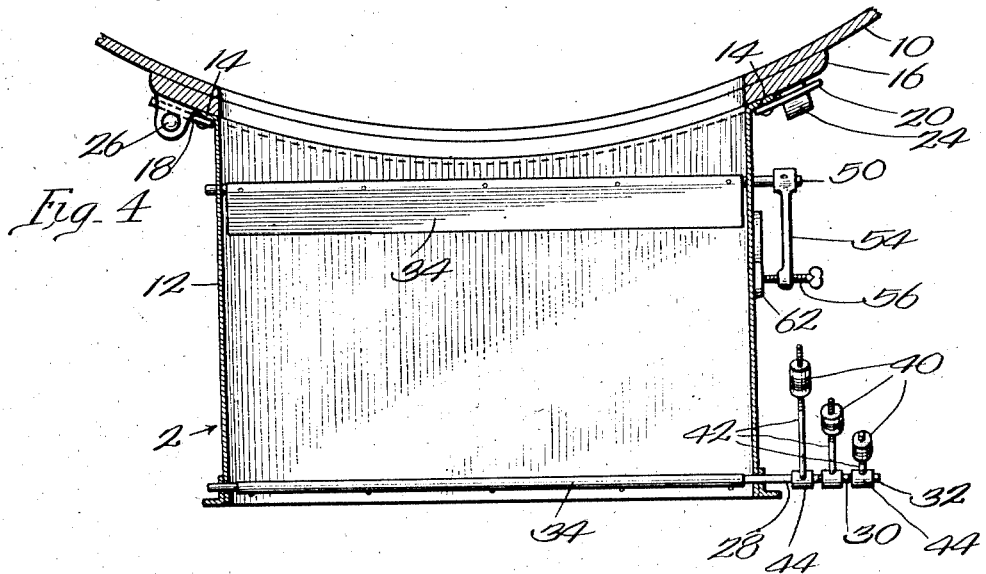
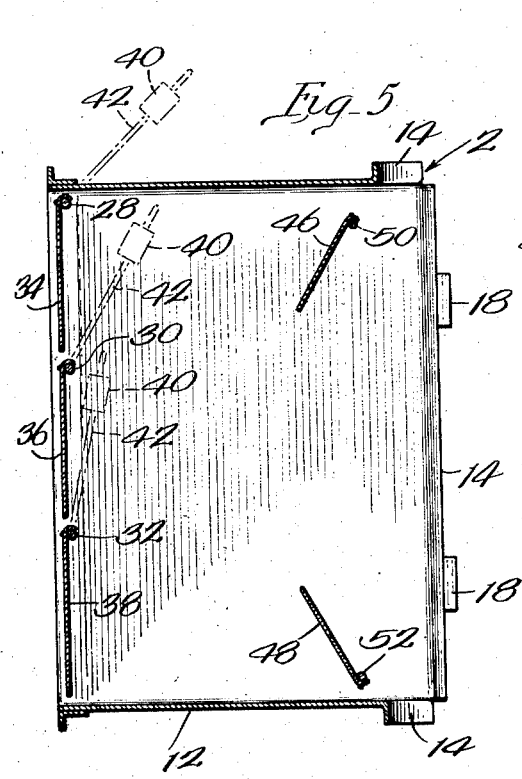
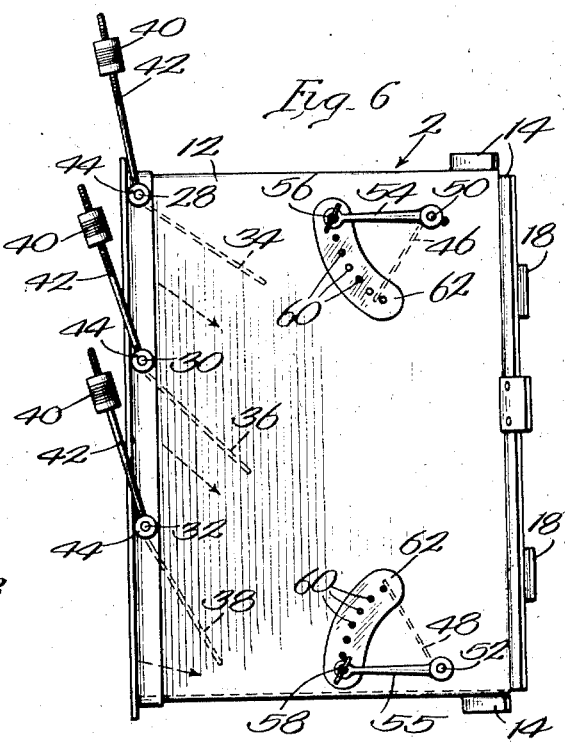

Patented Feb. 24, 1931

1,793,802

UNITED STATES PATENT OFFICE

LEROY E. HINTON, OF CHICAGO, ILLINOIS, ASSIGNOR OF ONE-HALF TO ROY PAGE, OF CHICAGO, ILLINOIS

DRAFT NORMALIZER

Application filed March 26, 1928. Serial No. 264,707.

My invention relates to draft controlling apparatus and more particularly to draft normalizers adapted to be applied to the chimney flue of heating systems and the like.

There are many factors and conditions which directly or indirectly affect the operating efficiency of heating systems such as heating systems or plants for large industrial institutions, hotels and the like as well as smaller heating units. One of the most important of these factors is that of proper draft control. To effect a high degree of operating efficiency in the combustion chamber of a heating system, the draft should be as constant as possible and should be maintained at a fixed velocity depending upon the load carried. If the draft is excessive, a large percentage of the developed heat passes unused through the chimney flue and likewise if the draft is insufficient, a condition which sometimes results from the presence of down drafts in the chimney flue, the heat developed is not sufficient to operate the system satisfactorily. Excessive and down draft conditions, as well as other abnormal draft conditions, are sometimes caused as a result of climatic conditions and sometimes the presence of adjacent tall buildings or other structures have a direct bearing upon the flow of gases through the chimney flue. In fact, in attempting to remedy abnormal draft conditions in heating systems, the conditions peculiar to and surrounding each system must be studied. In other words, no general rule can be applied to remedy abnormal draft conditions because each heating system is subjected to conditions which are necessarily peculiar to that system.

One of the primary objects of my invention is to provide means in association with the chimney flue of heating systems which will normalize draft conditions therein, said means being of simple and rigid construction and adjustable to meet conditions incident to the particular system with which it is associated.

A further object of my invention is to provide a draft normalizer which is self-contained and adapted to be readily attached to and detached from the chimney in the position normally occupied by the door of the clean-out opening of said chimney to reduce cost of installation.

A still further object of my invention is to provide a durable and efficiently operable automatic draft normalizing device comprised of a plurality of pivoted vanes, counter-weights being provided with said vanes which are adjustable so as to render said vanes responsive to predetermined draft conditions within the chimney flue.

And still another object of my invention is to provide a draft normalizing means which is readily attachable to a chimney flue or the like and which will permit air to be drawn in at the bottom or near the lower portion of said flue in such a manner that excessive draft conditions within the chimney will be automatically reduced and maintained at the proper draft for good combustion without obstructing the flue passage by closing dampers and the like.

More specifically, another object of my invention is to provide a self-contained automatic draft normalizing device readily attachable to a chimney flue or the like, said device being provided with a plurality of tiltable vanes and also with a plurality of adjustable baffle plates, each of the vanes being adjustable to respond to predetermined draft conditions within the chimney flue to permit the introduction of air therein, the baffle plates serving in such instances to cause the introduced air to be swirled because of deflection due to air being impinged on vanes automatically set at the proper angle by the draft of the flue, thereby conditioning said introduced air to cause the near constant upward movement of said air within the chimney flue and through the combustion chamber proper.

These and other objects will be more apparent from the following detailed description when considered in connection with the accompanying drawings, wherein—

Figure 1 is a perspective view of certain portions of a heating system with the chimney flue thereof equipped with a draft normalizing device which is representative of one embodiment of my invention;

Figure 2 discloses an enlarged perspective view of a detached draft normalizing device of the type disclosed in Figure 1, and also an enlarged fragmentary view of the lower portion of the chimney flue disclosed in Figure 1 with the draft normalizing device detached therefrom;

Figure 4 is a fragmentary horizontal sectional view of the device taken along the line 4—4 of Figure 3;

Figure 5 is a central, vertical section view of the draft normalizing device, the relative positions of the counter-weights being disclosed in dot and dash lines; and Figure 6 is a side elevational view of said device viewed from the right of Figure 3.

Figure 1:
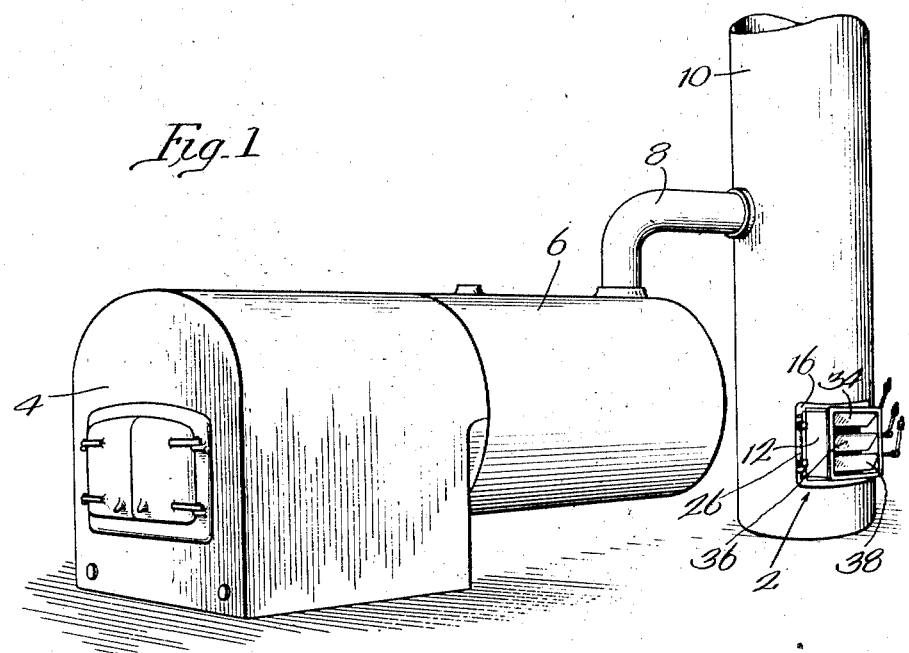
Figure 3:
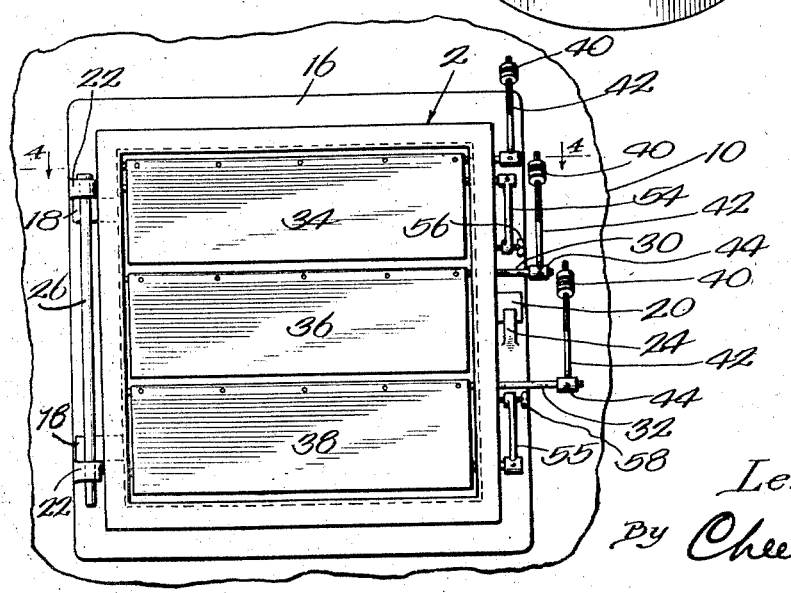
Figure 3 is an enlarged front elevational view of my draft normalizing or controlling device with the vanes thereof disclosed in vertical positions.

Referring now to the drawings wherein like numerals have been employed to disclose similar parts throughout the various figures, I have disclosed a draft normalizing device indicated generally by the numeral 2 which represents one embodiment of my invention. In Figure 1 I have disclosed certain parts of a heating system such as a fire-box 4, a boiler 6, a breaching 8 and a chimney flue 10 at the lower portion of which my improved device 2 is attached. It will be observed that my draft normalizing or controlling device 2 comprises a box-like casing 12, the rear edges of which are provided with suitable flanges 14. These flanges 14 are designed to engage a marginal flange 16 of the usual clean-out opening within the chimney flue 10. Thus, it will be observed the flanges 14 will engage the said marginal flange 16 in a manner similar to the manner in which the door (not shown) of the clean-out opening would normally engage said marginal flange. Extending laterally of one of the vertical flanges 14 is a pair of lugs 18 and extending laterally from the opposite vertical flange 14 is a lug 20. The upper lug 18 is adapted to be positioned beneath the usual clean-out opening hinge lug 22 and a lower lug 18 may be positioned so as to rest upon the lower hinge lug 22, clearly shown in Figure 3. The lug 20 is designed for engagement with the conventional door latch 24, and when the lugs 18 are properly positioned with respect to the hinge lugs 22, a pin 26 may be threaded through the hinge lugs as shown. In this manner the casing 12 is rigidly secured to the side of the chimney flue 10.

Extending transversely of the front portion of the casing 12 are three horizontal shafts 28, 30 and 32 respectively. Said shafts have suspended therefrom and rigidly secured thereto vanes 34, 36 and 38 respectively. Through the agency of these shafts, said vanes are pivotally mounted within the casing and said shafts at their outer extremities support suitable counter-weights 40. The weights are adjustably mounted upon threaded pins 42 which pins are secured at their lower extremities to a sleeve or collar 44. These collars 44 are secured to their respective shafts in any suitable manner such as by means of set screws or the like so as to permit the rotary adjustment thereof with respect to the shafts.

Extending transversely within the casing 12 is a pair of baffle plates 46 and 48 which are supported by suitable shafts 50 and 52 respectively. The outer extremities of these shafts 50 and 52 support arms 54 and 55 respectively and said arms are adapted to be adjustably positioned through the agency of suitable set screws 56 and 58. These set screws co-operate with apertures 60 formed in arcuate plates 62 suitably secured to the side wall of the casing 12.

Figure 2:
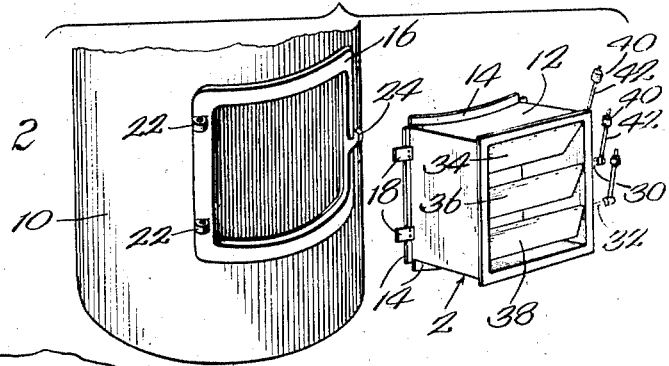

From the foregoing it is to be understood that in response to said draft conditions within the chimney flue 10, certain of the vanes 34, 36 and 38 may be caused to swing inwardly to the positions disclosed in Figures 1 and 2. It is also to be understood that under certain draft conditions within the chimney, the vanes may not be swung inwardly and hence will occupy a vertical position as disclosed in Figures 4 and 5. When the vanes occupy the vertical positions, the device 22 does not admit any air into the chimney flue but when, as a result of abnormal circumstances, an excessive draft or a down draft occurs within the chimney, the vanes will be caused to function. The effect of my draft controlling device will be more readily appreciated when excessive draft conditions within the chimney are considered which take place when the clean-out opening of said chimney is closed such as by means of the usual door (not shown). When an excessive draft takes place within the chimney under such circumstances, all of the air which is taken into the heating system for draft purposes passes through the fire-box 4 and thence upwardly through the breaching 8 and thence into the chimney flue 10. In this manner many of the hot gases are drawn off and wasted into the atmosphere and because of the excess draft an excessive amount of fuel is consumed. By employing my draft controlling device 2, I am able to greatly minimize the deleterious results from these excessive draft conditions within the chimney flue. This will be understood when it is observed that an increase in the draft through the chimney flue will cause one or more of the vanes 34, 36 and 38 to be swung inwardly thereby introducing air from the furnace room into the chimney flue. As this air enters the casing 12 it is moved into contact with the baffle plates 46 and 48 and these baffle plates cause the introduced air to be swirled, thereby conditioning the air before introducing it within the chimney flue. By conditioning the air I mean agitating said air so as to develop eddies therein and by introducing air which has been conditioned in this manner into the chimney flue, I preclude the possibility of causing a sudden surge of air upwardly through the chimney flue past the egress of the breaching. Thus, it will be understood that I supply properly conditioned air from the furnace room in response to the abnormal conditions which cause an excessive updraft within the chimney and thereby avoid the excessive intake of air through the fire-box as hereinbefore explained. In this way I am able to substantially maintain normal or constant draft conditions within the fire-box because I supply air through the device 2 instead of through the fire-box. Other abnormal draft conditions within the heating system, disclosed in Figure 1, may be controlled through the agency of my improved normalizer and in order to properly adjust the vanes thereof I employ the counter-weights 40.

By means of these counter-weights 40, which are threaded upon the companion pins 42, each of the vanes may be adjustably counter balanced so that each of said vanes will tiltably respond to predetermined draft conditions within the chimney flue. It has been found, after considerable experimentation, that the responsiveness of the vanes will vary in accordance with the particular chimney flue with which the draft normalizing device 2 is associated. In some instances it has been found desirable to arrange the vanes in such a manner that the lowermost vane 38 will respond or tilt more readily than either of the vanes 34 or 36, and likewise it has been found that in other instances it is desirable to have the uppermost vane 34 more easily tiltable than the other vanes. As hereinbefore suggested, the draft conditions in heating systems vary in accordance with the inherent characteristics of each of the systems. It is to be understood then that my improved draft controlling device provides a means which may be adjusted to meet the conditions incident to each system with which the device is employed. The vanes 34, 36 and 38 in a sense serve as valves to permit the introduction of air into the chimney flue in response to certain currents or draft conditions within the flue, and these valves or vanes may very easily be adjusted so as to cause the introduction of the proper amount of air into the flue by merely varying the position of the counter-weights 40 along the threaded pins 42. It will also be apparent that my device operates automatically and thus provides a very convenient and effective type of apparatus.

From the foregoing it will be understood that to install my improved device it is only necessary to remove the usual clean-out door from the chimney flue and replace said door by means of my compact box-like structure.

After the device has been thus positioned, the counter-weights 40 may be adjusted to control the operation of the vanes in accordance with the draft conditions which are to be remedied. Obviously adjustment of the counter-weights may be continued until the results show that the said vanes are properly responsive or tiltable, that is to say, until the draft conditions within the chimney flue over a period of time have been found to be comparatively normal or constant.

Thus my invention provides a compact and durably constructed apparatus which is readily attachable to a chimney flue and which is adjustable so as to effect proper draft conditions within the flue. By proper draft conditions within the flue, I mean such conditions which will present a substantially constant draft of proper velocity within the flue, thereby maintaining the rate of combustion within the fire-box of the heating system as low as possible and at the same time enabling the efficient operation of the entire system. By maintaining the above mentioned proper draft conditions within the chimney flue, the amount of heat which passes out of the chimney unused is kept at a minimum and the products of combustion which normally accumulate at the bottom of the flue are likewise reduced to a minimum. The baffle plates 46 and 48, as hereinbefore mentioned, very effectively serve to condition or agitate the air introduced in response to the tilting of the vanes, so that as the air passes upwardly through the chimney flue 10, the eddies formed therein effect the proper upward flow thereof. The normal or constant movement of the hot gases upwardly within the flue due to the pre-conditioning of the introduced air should be distinguished from the irregular or non-uniform current flow resulting in sudden surges which are sometimes caused by high winds and other atmospheric conditions. It is these sudden surges or non-uniform current flow conditions within the flue which my improved apparatus serves to minimize and in so doing excessive and undesirable downdraft conditions within the flue are materially reduced. It will thus be apparent that my invention produces draft conditions within the chimney flue which insures the efficient functioning of a heating system and that said invention is readily adjustable to meet the draft conditions, which are peculiarly incident to the system with which it is associated.

It will also be observed that my invention enables the stabilizing or normalizing of draft conditions within a heating system without the necessity of withdrawing an excessive amount of air from the furnace room and this is an important factor in large heating plants where the air which normally passes into the combustion chamber is with-drawn or supplied from the furnace room. Throughout this specification and in some of the claims I have referred to my improved device as a means for effecting the "normalizing of draft conditions within the flue". By normalizing draft conditions within the flue, I mean maintaining a near constant velocity of the gases passing through the flue. These normalized draft conditions are obtained by automatically controlling the admission of a plurality of streams of air into the chamber of the boxlike structure 2 as indicated by the arrows in Figure 6. These streams of air impinge one another, and as a result of this impingement an eddying or swirling action of the introduced air is obtained, and this swirled or eddied air passes into the lower portion of the chimney flue. The size of the streams of impinged air varies in accordance with the position occupied by the vanes 34, 36, and 38, and the adjustable baffle plates 46 and 48 cooperate with these vanes in expediting the eddying or swirling action of the air. In other words, these streams of air also impinge the baffles 46 and 48, and it will be apparent that the effectiveness of the baffles will be determined by the angular disposition of said baffles. Each chimney flue presents a new problem to be solved, and therefore the vanes and the baffle plates must be adjusted in accordance with the particular flue with which they are associated. To obtain the most satisfactory non-fluctuating draft conditions within the flue, it is necessary that the air which is swirled and eddied at a point externally of the flue, be properly introduced within the flue at a point below the breaching 8. Thus, as this swirled or eddied air reaches the mixing point, namely, the point within the flue at the breaching, hot gases from the breaching combine with the introduced swirled cold gases or air, and there is obviously an expansion of the cold gas and a contraction of the hot gases. If this mixing takes place without subjecting the introduced colder air to the above mentioned eddying or swirling action, normalized or non-fluctuating draft conditions within the flue are not obtained. However, if my improved mechanism is employed to effect the mixing or combining of the eddied air with the hot gases at the breaching, near constant draft conditions within the flue are obtained. Admitting air within a flue by using conventional dampers and the like, causes disturbances at the mixing zone, namely, the zone within the flue at the breaching, and these disturbances cause a puffing back of the smoke in the breaching, and when these disturbances are recorded by draft gauges and flue gas analysis, the results clearly indicate interference with combustion. Conventional types of damper controls are not designed to produce the eddying or swirling of air so as to effect normal, steady, balanced, and non-fluctuating draft conditions, which are imperative to highly efficient combustion.

Although I have disclosed and described a draft controlling device having a particular type of vane or valve which is responsive to predetermined draft conditions within the chimney flue and the like, and also a particular type of baffle plate associated therewith, it is to be understood that my invention is not limited to these specific structures, but is capable of many other forms and modifications without departing from the spirit and scope of my invention, as set forth in the claims.

Having thus described what I claim as new and desire to secure by Letters Patent is:

1. In combination with a chimney flue, a draft controlling device including a valve self responsive to the draft within the flue to control the introduction of air thereto, thereby effecting the normalizing of draft conditions within the flue, and a baffle for eddying the air prior to its introduction within the flue.

2. In combination with a chimney flue, a draft controlling device comprising a valve self responsive to the draft within the flue to control the introduction of air thereto, and a baffle means for eddying the air previous to its introduction within the flue, said baffle being pivotally and adjustably mounted.

3. In combination with a chimney flue having an opening at the lower portion thereof, a draft normalizing device comprising a frame readily adaptable for association with the flue opening, a tiltable vane extending transversely of the frame responsive to the draft within the flue to control the introduction of air thereto, and a baffle plate extending transversely of the frame for agitating and thereby eddying the air before it is introduced within the flue.

4. In a draft controlling device of the class described for association with the flue of a heating system, a box-like frame, a plurality of tiltable vanes positioned at different levels across the opening at one extremity of the box-like frame to effect the introduction of a plurality of impinging streams of air, means for independently adjusting the tiltability of said vanes, and a baffle plate extending transversely of the opposite end of the box-like frame, said baffle being angularly adjustable therein and adapted to cooperate with the vanes in eddying the air.

5. In a draft normalizing device of the class described for chimney flues and the like, a box-like frame having an opening at each end thereof, a plurality of pivoted vanes positioned at different levels to effect the introduction of a plurality of impinging streams of air and extending horizontally at one end of the box-like frame, an adjustable counterweight associated with each vane, and a plurality of horizontally positioned baffle plates mounted within the frame adapted to cooperate with said vanes in eddying the air.

6. In combination with a vertical flue passage for conducting hot gases, a draft normalizing device including a chamber adapted to be positioned laterally with respect to said flue passage, a plurality of vanes traversing said chamber which are self-responsive to draft conditions within the flue to effect the introduction of air within said chamber, and a baffle adapted to be impinged by air introduced in response to the movement of said vanes, said vanes and baffle cooperating to eddy the air within said chamber prior to its introduction within the flue.

7. In combination with a substantially vertical chimney flue and a breaching opening into said flue, a draft controlling device including a casing positioned below the point where the breaching enters the flue and to one side of said flue, said casing being opened at each end, one end thereof communicating with the flue and the other end communicating with the external atmosphere, a plurality of tiltable vanes disposed in substantial vertical alinement within said casing, which are adapted when tilted in response to draft conditions within the flue to effect the introduction of a plurality of streams of air within the casing so as to effect the swirling of said air prior to the passage thereof into the flue, counterbalancing means associated with each vane, and a baffle plate traversing said casing at a point between the end of the casing which opens into the flue and said vanes, whereby to further expedite the swirling of the air streams introduced within the casing prior to the passage thereof into the flue.

In witness whereof, I have hereunto subscribed my name.

LEROY E. HINTON.